US008152367B2

(12) United States Patent
Roberts et al.

(10) Patent No.: US 8,152,367 B2
(45) Date of Patent: Apr. 10, 2012

(54) INSULATED CONTAINER HAVING A TEMPERATURE MONITORING DEVICE

(75) Inventors: William Peyton Roberts, Spartanburg, SC (US); Thomas D. Kennedy, Simpsonville, SC (US); Tom Windisch, Hugo, MN (US); David W. Hagood, Ft. Worth, TX (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 806 days.

(21) Appl. No.: 12/109,624

(22) Filed: Apr. 25, 2008

(65) Prior Publication Data

US 2008/0272131 A1 Nov. 6, 2008

Related U.S. Application Data

(60) Provisional application No. 60/916,085, filed on May 4, 2007.

(51) Int. Cl.
*G01K 1/08* (2006.01)
*G01K 13/00* (2006.01)

(52) U.S. Cl. ........ 374/141; 374/109; 374/208; 374/117; 340/870.17; 220/523

(58) Field of Classification Search .................. 374/100, 374/141, 117–119, 208, 163, 183, 30–39, 374/4, 57, 109; 340/870.17
See application file for complete search history.

(56) References Cited

U.S. PATENT DOCUMENTS

| 1,567,008 A | 12/1925 | Spreen | |
|---|---|---|---|
| 3,000,376 A * | 9/1961 | Smith et al. | 600/22 |
| 3,257,820 A * | 6/1966 | Case et al. | 62/223 |
| 3,609,728 A * | 9/1971 | Quinn et al. | 340/870.17 |
| 4,585,999 A * | 4/1986 | Hilbert et al. | 330/61 R |
| 5,103,651 A * | 4/1992 | Coelho et al. | 62/341 |
| 5,257,863 A * | 11/1993 | Chu et al. | 374/153 |
| 5,363,670 A * | 11/1994 | Bartilucci | 62/166 |

(Continued)

FOREIGN PATENT DOCUMENTS

CH 534 335 2/1973

(Continued)

OTHER PUBLICATIONS

PCT Search Report and Written Opinion for PCT/US2008/061874 dated Sep. 11, 2008.

*Primary Examiner* — Gail Verbitsky
(74) *Attorney, Agent, or Firm* — Alston & Bird LLP

(57) ABSTRACT

The invention provides an insulated container having a temperature monitoring device that can be used to maintain an object stored in the container at a temperature that is below the normal operating temperature of the temperature monitoring device while still permitting the taking of measurements of the interior of the container. The container includes an RF transponder having an RF antenna, a temperature sensor, and a battery that is operatively connected to the transponder and the temperature sensor. The temperature sensor is positioned in the container so that it is in a temperature monitoring relationship with the interior space of the container. The battery is positioned at least partially in one of the walls of the container at a location that is spaced apart from the temperature sensor and that is selected so that the battery does not experience a temperature that is below an operating temperature of the battery.

30 Claims, 6 Drawing Sheets

U.S. PATENT DOCUMENTS

| | | | |
|---|---|---|---|
| 5,400,610 A * | 3/1995 | Macedo | 62/130 |
| 5,421,247 A | 6/1995 | Shim | |
| 5,426,428 A * | 6/1995 | Binder et al. | 340/870.17 |
| 5,598,713 A * | 2/1997 | Bartilucci | 62/78 |
| 5,603,220 A * | 2/1997 | Seaman | 62/3.7 |
| 6,253,570 B1 | 7/2001 | Lustig | |
| 6,579,006 B1 | 6/2003 | Pariseau | |
| 6,921,197 B2 * | 7/2005 | Aubel et al. | 374/141 |
| 7,040,139 B2 * | 5/2006 | Sunshine | 73/23.2 |
| 7,057,527 B2 * | 6/2006 | Hunter | 340/870.17 |
| 7,070,053 B1 * | 7/2006 | Abrams et al. | 206/459.5 |
| 7,706,671 B2 * | 4/2010 | Brown | 392/498 |
| 2002/0000918 A1 | 1/2002 | Hunter | |
| 2004/0055313 A1 * | 3/2004 | Navedo et al. | 62/6 |
| 2004/0116822 A1 * | 6/2004 | Lindsey | 600/549 |
| 2005/0069861 A1 * | 3/2005 | Zimmermann et al. | 435/1.1 |
| 2005/0188715 A1 * | 9/2005 | Aragon | 62/371 |
| 2005/0247782 A1 | 11/2005 | Ambartsoumian | |
| 2005/0248455 A1 | 11/2005 | Pope et al. | |
| 2005/0260760 A1 * | 11/2005 | Hucker | 436/1 |
| 2006/0239331 A1 | 10/2006 | Schwegman | |
| 2006/0290496 A1 * | 12/2006 | Peeters | 340/572.1 |
| 2007/0001850 A1 * | 1/2007 | Malone et al. | 340/572.1 |
| 2008/0031483 A1 * | 2/2008 | Hill | 381/334 |
| 2008/0315596 A1 * | 12/2008 | Terry et al. | 292/327 |
| 2009/0225517 A1 * | 9/2009 | Nelson et al. | 361/709 |
| 2010/0189158 A1 * | 7/2010 | Rock | 374/141 |
| 2010/0304672 A1 * | 12/2010 | Lerner | 455/41.2 |

FOREIGN PATENT DOCUMENTS

| | | |
|---|---|---|
| CN | 1620247 A | 5/2005 |
| EP | 0 565 925 | 10/1993 |
| EP | 1 284 400 | 2/2003 |
| EP | 1 486 763 | 12/2004 |
| EP | 1 724 541 | 11/2006 |
| JP | 03241275 A * | 10/1991 |
| JP | 2006214644 A * | 8/2006 |
| JP | 2007286999 A * | 11/2007 |
| WO | WO 03/091678 | 11/2003 |
| WO | WO 2005/106813 | 11/2005 |
| WO | WO 2006/010108 | 1/2006 |

* cited by examiner

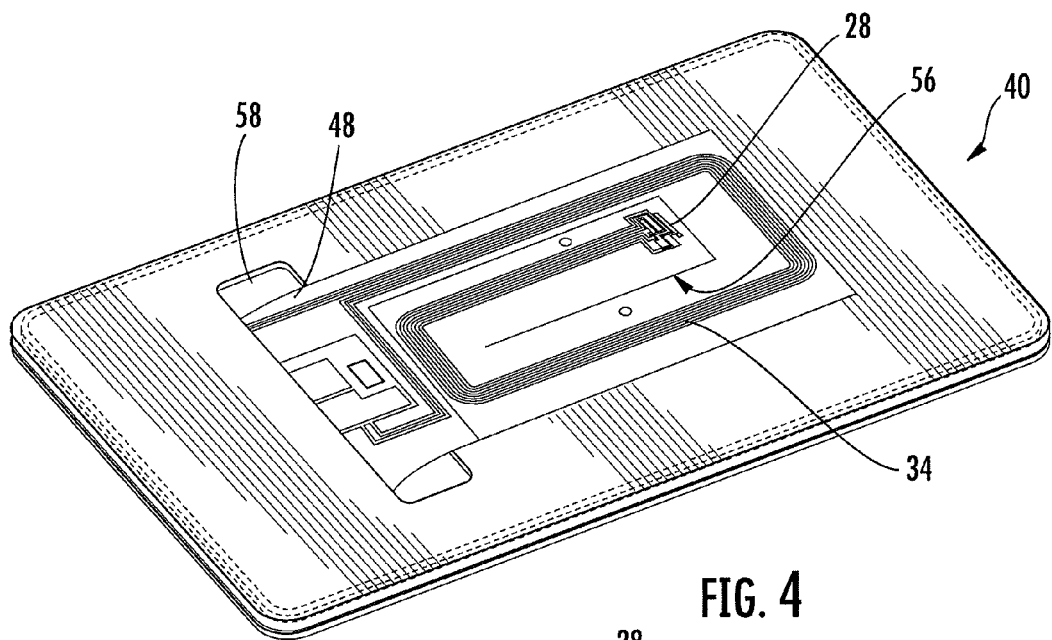
FIG. 4
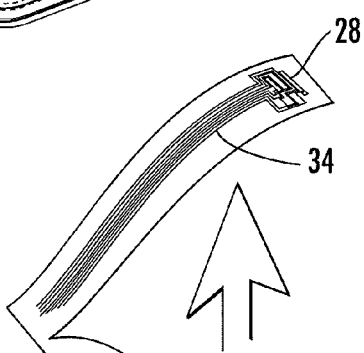
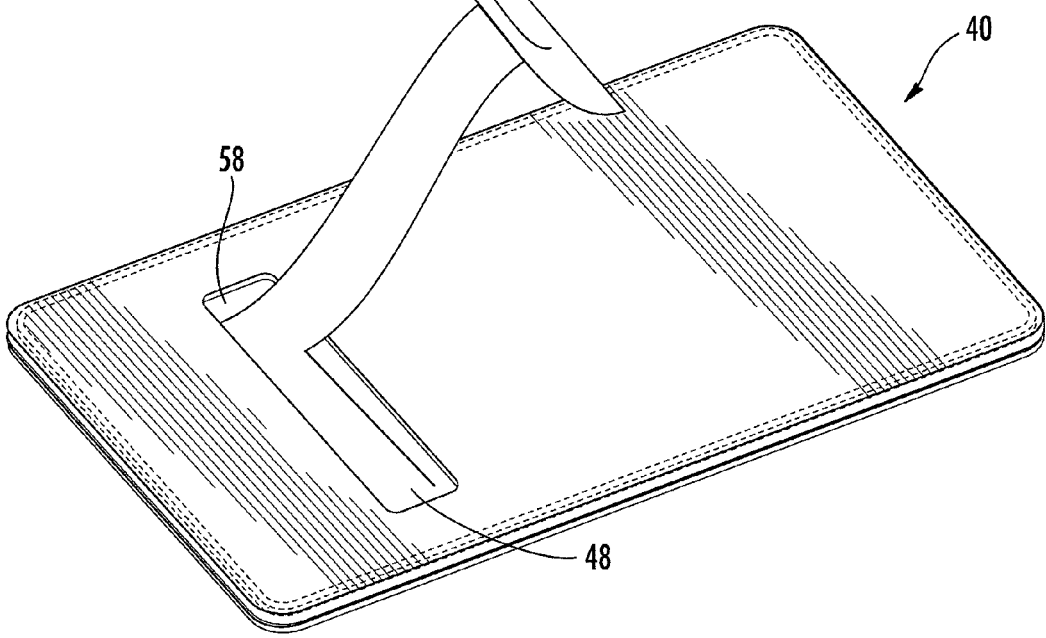
FIG. 5

INSULATED CONTAINER HAVING A TEMPERATURE MONITORING DEVICE

CROSS REFERENCE TO RELATED APPLICATIONS

This application claims the benefit of Provisional Application No. 60/916,085, filed on May 4, 2007, the contents of which are hereby incorporated by reference.

FIELD OF THE INVENTION

This invention relates to insulated containers, and in particular to insulated containers having an embedded temperature monitoring device.

BACKGROUND OF THE INVENTION

The quality and safety of many temperature-sensitive products such as pharmaceuticals, food products, chemicals, and biological products can be adversely affected by improper temperature control during processing, distribution, and storage. As a result, there are many circumstances where it may be necessary to process, ship, and/or store temperature-sensitive products in a low-temperature environment.

To accommodate the need to maintain a low-temperature environment, a wide variety of insulated containers have been developed. Generally, these containers use different types of refrigeration and insulation materials to maintain a desired thermal environment within the container. To ensure that a desired thermal environment has been maintained in such containers, various temperature monitoring devices have been developed to be used in conjunction with the thermal containers. Time-Temperature Indicators (TTI) and electronic monitoring devices are examples of two devices that are commonly used for monitoring the temperature exposures of various products.

TTI devices generally use a change in physical appearance to indicate temperature exposure. TTIs typically use physical, chemical, electrochemical, enzymatic, or microbiological change that may be expressed as a visible response in the form of a mechanical deformation, color development, or color movement. The rate of change can be temperature dependent so that it increases at higher temperatures. As a result, the physical response may be used to give a cumulative indication of the temperature conditions to which the TTI has been exposed. Typically, these TTI devices are inexpensive and may be in the form of a label that can be attached or adhered to packages or objects. TTI devices generally need to be placed in the interior of the container in close proximity to the monitored product, and as a result, require the container to be opened in order to permit visualization of the TTI. However, in many circumstances it may be undesirable to open the container until it has reached its final destination and/or just prior to use. A further disadvantage of TTI devices is that the indicators may give false readings. False readings could result in the disposal or rejection of otherwise acceptable products.

Electronic monitoring devices are a second type of device that may be used to monitor temperature exposure. Electronic monitoring devices are typically small portable devices that include instruments and memory for measuring and storing temperature readings. Electronic monitoring devices, such as data loggers, can be used to monitor and record a variety of different environmental parameters. Data loggers are small, battery-powered devices that may be equipped with a microprocessor, sensors, and a memory for storing data. Data loggers may be programmed to take specific measurements at desired time intervals. Data loggers can be used to create a more complete and accurate picture of any changes in environmental conditions. Generally, the data logger must be placed in close proximity to the product being monitored in order to provide an accurate temperature measurement of the product. However, in many cases it may not be practical to place the data logger in the interior of the container. As a result, many conventional data loggers cannot be used to measure the interior temperature of the container. Accordingly, there still exists a need for an improved insulated container and method that can be used to measure the interior temperature of the insulated container.

BRIEF SUMMARY OF THE INVENTION

The present invention provides an insulated container having a temperature monitoring device that is at least partially disposed in one or more walls of the container, and that permits temperature measurements of the interior space of the container to be taken at temperatures that are below the normal operating temperature of the temperature monitoring device. The temperature monitoring device includes an RF transponder so that temperature measurements can be wirelessly retrieved without having to open or otherwise disturb the interior contents of the container.

In one embodiment, the container includes a radio frequency (RF) transponder having an RF antenna, a temperature sensor, and a battery that is operatively connected to the transponder and the temperature sensor. The temperature sensor is positioned in the container so that it is in a temperature monitoring relationship with the interior space of the container. The battery is positioned at least partially in one of the walls of the container at a location that is spaced apart from the temperature sensor and that is selected so that the battery does not experience a temperature that is below an operating temperature of the battery. As a result, the container can be used to maintain an object stored in the container at a temperature that is below the normal operating temperature of the temperature monitoring device while still permitting the taking of temperature measurements of the interior of the container.

In one embodiment, the container includes a plurality of walls that define a container having an outer surface, an inner surface, and an interior space. In one particular embodiment, the temperature sensor is disposed adjacent to an inner surface of the container whereas the battery is disposed adjacent to an outer surface of the container.

In one embodiment, the present invention provides an insulated container with an embedded temperature sensor. The insulated container includes a plurality of walls that comprise a thermal insulation material. The container may include an outer surface, an inner surface, and an interior space, wherein the inner surface of the container faces the interior space of the container. The container may also include a radio frequency transponder having a radio frequency circuit and a radio frequency antenna, a temperature sensor disposed in a temperature monitoring relationship with the interior space of the container, and an electric circuit extending through at least a portion of at least one of the walls and interconnecting the temperature sensor with the radio frequency antenna so that a temperature measurement of the interior space can be retrieved from the temperature sensor by communicating with the transponder. In one embodiment, the container includes a battery that is at least partially disposed in one of the walls of the container and is operatively connected with the radio frequency transponder and the temperature sensor. The position of the battery within the wall can be selected so that the battery does not experience a temperature that is below an operating temperature of the battery.

In some embodiments the insulated container may also include a memory component that is capable of storing one or more temperature measurements, and that is interconnected with the temperature sensor and the radio frequency transponder. The memory component can be configured to store temperature measurements as a function of time. In one embodiment, the temperature sensor and the radio frequency circuit comprise a single integrated circuit.

The present invention can be used to maintain a wide variety of temperature-sensitive objects at temperatures that exceed the normal operating conditions of the temperature monitoring device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a perspective view of the temperature monitoring device of FIG. 3 in which an electric circuit having a temperature sensor is depicted as extending outwardly from the temperature monitoring device;

FIG. 5 is a perspective view of the temperature monitoring device of FIG. 5 in which the length of the electric circuit is increased so that the temperature sensor can be positioned at a spaced apart location from the battery of the temperature monitoring device;

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
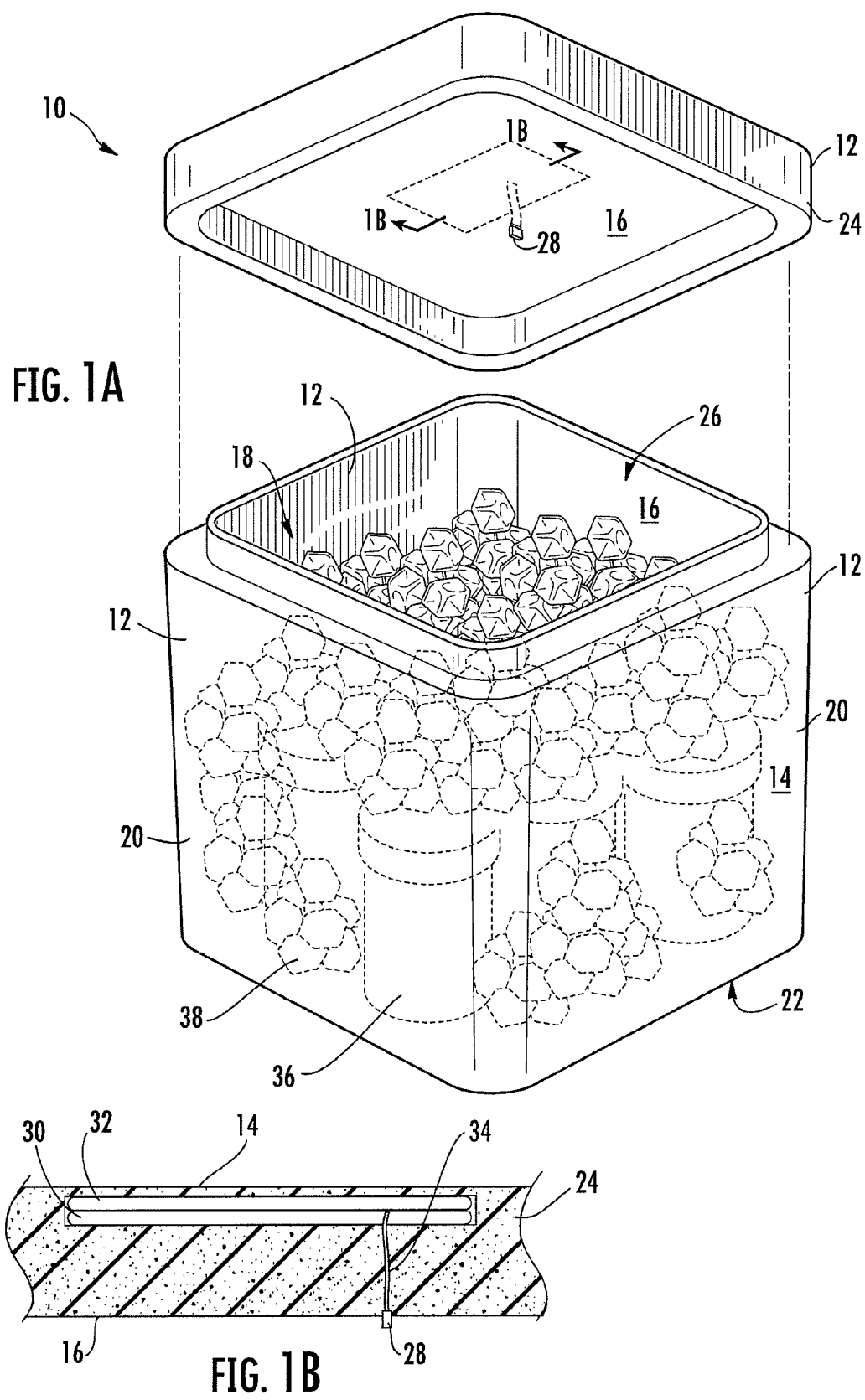
FIG. 1A is a perspective view of an insulated container that is in accordance with one embodiment of the present invention.
FIG. 1B is a cross-sectional side view of a portion of the container's lid taken along line 1B of FIG. 1A.
Figure 2:
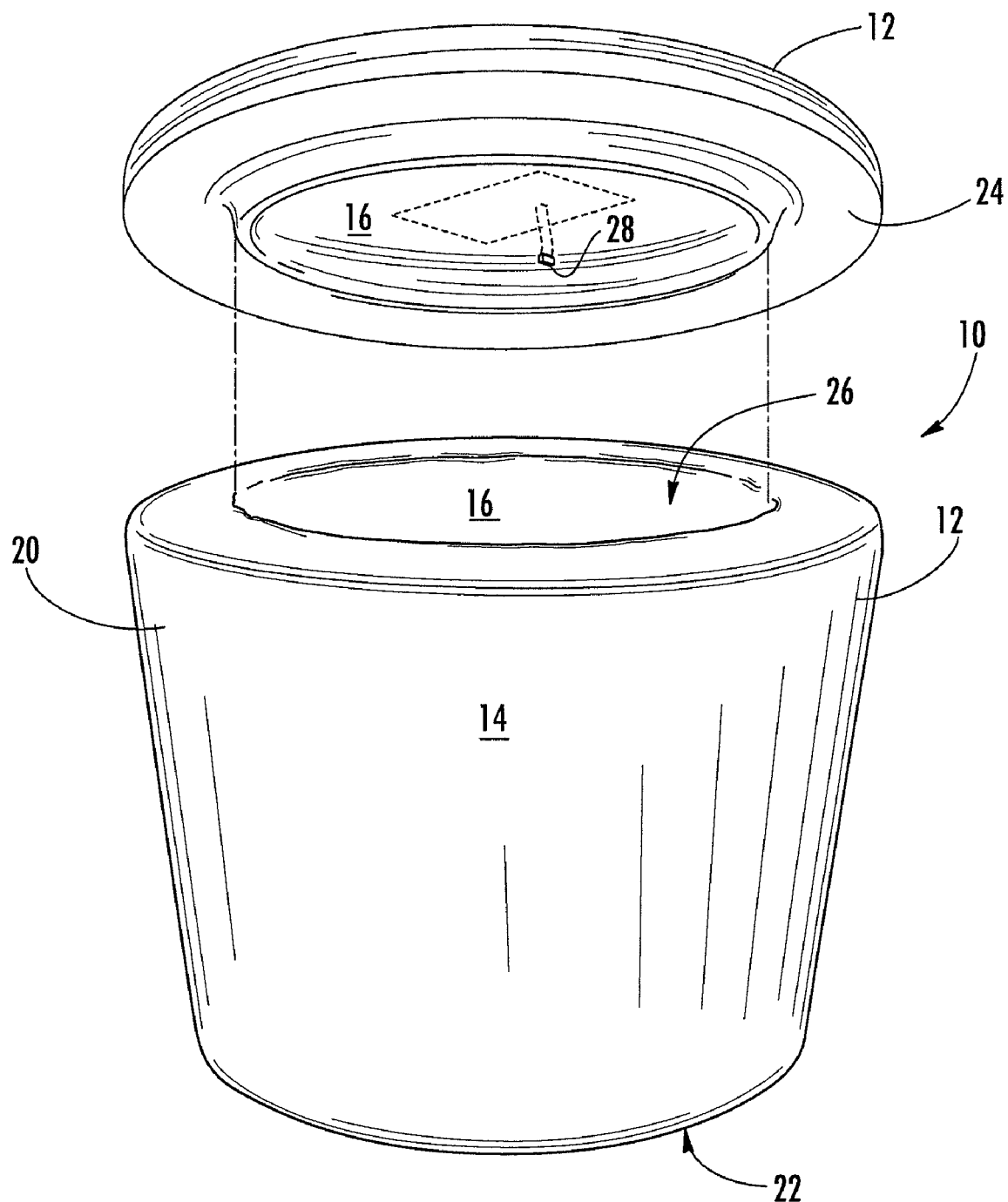
FIG. 2 is a perspective view of an insulated container having a cylindrical shape that is in accordance with one embodiment of the present invention.

With reference to FIGS. 1A, 1B, and 2, insulated containers that are in accordance with one or more embodiments of the present invention are illustrated, and broadly designated by reference character 10. Container 10 includes a plurality of walls (collectively referred to as reference number 12) that define container 10 having outer surface 14, inner surface 16, and interior space 18. In one embodiment, the container includes sidewalls 20, bottom wall 22, upper wall 24 and a mouth 26 opposite the bottom wall defining an opening into the interior space of the container. In some embodiments, upper wall 24 can comprise a closeable and/or removable lid for the container.

As discussed in greater detail below, the walls 12 comprising the container generally comprise a thermal insulating material that is capable of maintaining the interior space of the container at a desired temperature. Although FIG. 1A depicts a generally square container, it should be recognized that the container is not limited to any particular shape or size. For example, the container can have a generally rectangular, cylindrical, or oblong shape, and the like. In one embodiment, the container has a generally cylindrical shape in which the sidewall of the container is continuous. In this regard, FIG. 2 illustrates an embodiment of the invention in which the container 10 has a generally cylindrical shape and includes a plurality of walls 12 having a continuous sidewall 20, bottom wall 22, upper wall 24, and mouth 26 opposite the bottom wall defining an opening into the interior space of the container.

Container 10 includes an embedded temperature monitoring device that permits the measurement of the temperature within the interior space of the container without having to open or examine the interior space of the container. The temperature monitoring device includes a temperature sensor 28 that is disposed in a temperature monitoring relationship with the interior space of the container 10. As can best be seen in FIG. 1B, the temperature sensor is electrically interconnected with an RF transponder 30 or other radio frequency identification (RFID) system that can be used to track and trace products or monitor an environmental condition or with an RF communication interface protocol such as Bluetooth or Zigbee. The RF transponder generally includes an RF chip and an RF antenna. Temperature measurements can be wirelessly retrieved from the electronic monitoring device by communicating with the RF transponder using an RF reader.

In some embodiments, the temperature sensor and RF transponder may comprise separate components of the temperature monitoring device. In one embodiment, the RF chip and the temperature sensor may comprise a single integrated chip or circuit. An example, of a single integrated chip is the VarioSens® chip, which is available from KSW-Microtec. In embodiments where the temperature sensor and RF transponder comprise a single integrated chip or circuit, it may be desirable to position the RF antenna towards the outer surface 14 of the container to help facilitate communication between an RF reader and the RF transponder. In other embodiments, the temperature sensor and the RF transponder are separate components that are positioned in a spaced-apart relationship with respect to each other.

The temperature monitoring device also includes a battery 32 that is operatively connected with the temperature sensor 28 and the RF transponder 30. The temperature sensor 28 is operatively connected to the battery 32 with an electric circuit 34 that extends through at least a portion of at least one of the walls 12. Electrical circuit 34 permits the battery 32 to be positioned at a spaced apart location from the temperature sensor, and in particular from the interior space of the container.

Depending on the nature of the object stored in the container, the temperature of the interior space of the container can be below about −70° C., and in particular, below about −80° C. At such temperatures, the battery may have reduced performance or may fail to function altogether. To prevent failure of the battery, the position of the battery within the wall is selected so that the battery does not experience a temperature that is below the operating temperature of the battery. For example, many batteries comprise an electrolyte or similar material that may freeze at temperatures below about −30° C. or −40° C. To prevent failure of the battery, the battery is positioned at a location that is spaced apart from the temperature sensor, and in particular from the interior space of the container. In this regard, FIG. 1B depicts the battery positioned within one of the walls of the container at a location that is towards or adjacent to the outer surface 14 of the container. In some embodiments, the battery may be positioned completely within the wall, as shown in FIG. 1B, or alternatively, may be positioned outside of or partially within the wall. In one embodiment, the battery may be spaced apart from the temperature sensor at a distance of from about 0.5 to 12 inches, and in particular from about 0.5 to 6 inches, and more particularly from about 1 to 6 inches.

FIG. 1A depicts a temperature-sensitive object 36 that is surrounded by a refrigerant, such as dry ice 38. The temperature sensor 28 is positioned in a temperature monitoring relationship with the interior space 18 of the container so that the storage temperature of object 36 can be measured. In some embodiments, the temperature sensor can be positioned so that it is completely or at least partially disposed within the interior space of the container. For example, FIGS. 1A and 1B depict an embodiment wherein the temperature sensor is in direct contact with the atmosphere of the interior space. In other embodiments, the temperature sensor can be disposed in the wall of the container towards or adjacent to the inner surface 16 of the container (see briefly FIG. 7). It should be understood that the exact position of the temperature sensor is not critical to the invention provided that the temperature sensor is disposed in a temperature monitoring relationship with the interior of the container. Generally, the temperature sensor should be positioned so that it can determine the temperature within about 5° C. of the actual temperature of the adjacent interior space of the container, and in particular within about 1° C. of the actual temperature of the interior space of the container.

The exact nature of a temperature monitoring relationship can vary depending upon the environment in the interior of the container, the temperature sensitivity of the object disposed in the container, and the thermal insulating properties of the material comprising the container. For instance, in some cases the environment within the container may have minimal temperature variation. In this type of environment, the temperature sensor may be disposed at a greater distance from the object within the container without compromising the uniformity in temperature exposure of the temperature sensor. In other environments the temperature may have some fluctuation from point-to-point within the container. To ensure uniformity in temperature exposure in this type of environment, it may be desirable to position the temperature sensor in close proximity to the object to be monitored. Additionally, the position of the temperature sensor may also depend, at least in part, on the insulating properties of the material comprising the container. For example, materials having higher insulating properties may generally confine the cold temperatures to near or adjacent the interior of the container. As a result, to ensure that the temperature sensor is disposed in a temperature monitoring relationship, it may be desirable to position the temperature sensor within the interior space of the container or adjacent to the inner surface of the container.

As briefly discussed above, the walls of the container generally comprise a thermal insulating material that is capable of maintaining a desired temperature within the interior of the container. In one embodiment, the walls are formed of a thermal insulating material such as a polymeric foam. Examples of suitable polymeric foams may include polyurethane, polystyrene, polyolefin, such as polyethylene and polypropylene, and combinations thereof. In some embodiments, the container may be formed from one or more vacuum insulated panels (VIPs). In one embodiment, the VIP may comprise a vacuumized foam or powder core encapsulated by a barrier film comprising one or more polyolefin, polyester, metal foil, and/or nylon layers. The VIP may in turn be encased in a protective shell comprising a thin yet durable thermoplastic material or foam. In a further embodiment, the VIP panel can be embedded in a foamed matrix. The container and/or one or more of the walls can be formed using molding, thermoforming, lamination, and the like.

In one embodiment, the container wall in which the temperature monitoring device is disposed may contain an insulating structure having one or more metallized film or metallic foil layers. In one particular embodiment, one or more metallized film or metallic foil layers may be disposed between the temperature sensor and the RF transponder and/or RF antenna. In this embodiment, the metallized film or metallic foil may include a passageway, such as slit, hole, seam, etc., through which electric circuit can extend between the temperature sensor and the RF antenna and/or transponder. For example, the wall may comprise a VIP panel in which the metal layer comprises an outer layer of the panel, and wherein the RF antenna is disposed on the side of the metal layer that is towards the exterior of container. Whereas the temperature sensor is disposed on the opposite side of the metal layer towards the interior space of container such as the core. As discussed above, the core of the VIP panel typically comprises an insulating material, such as a foam.

Figure 3:
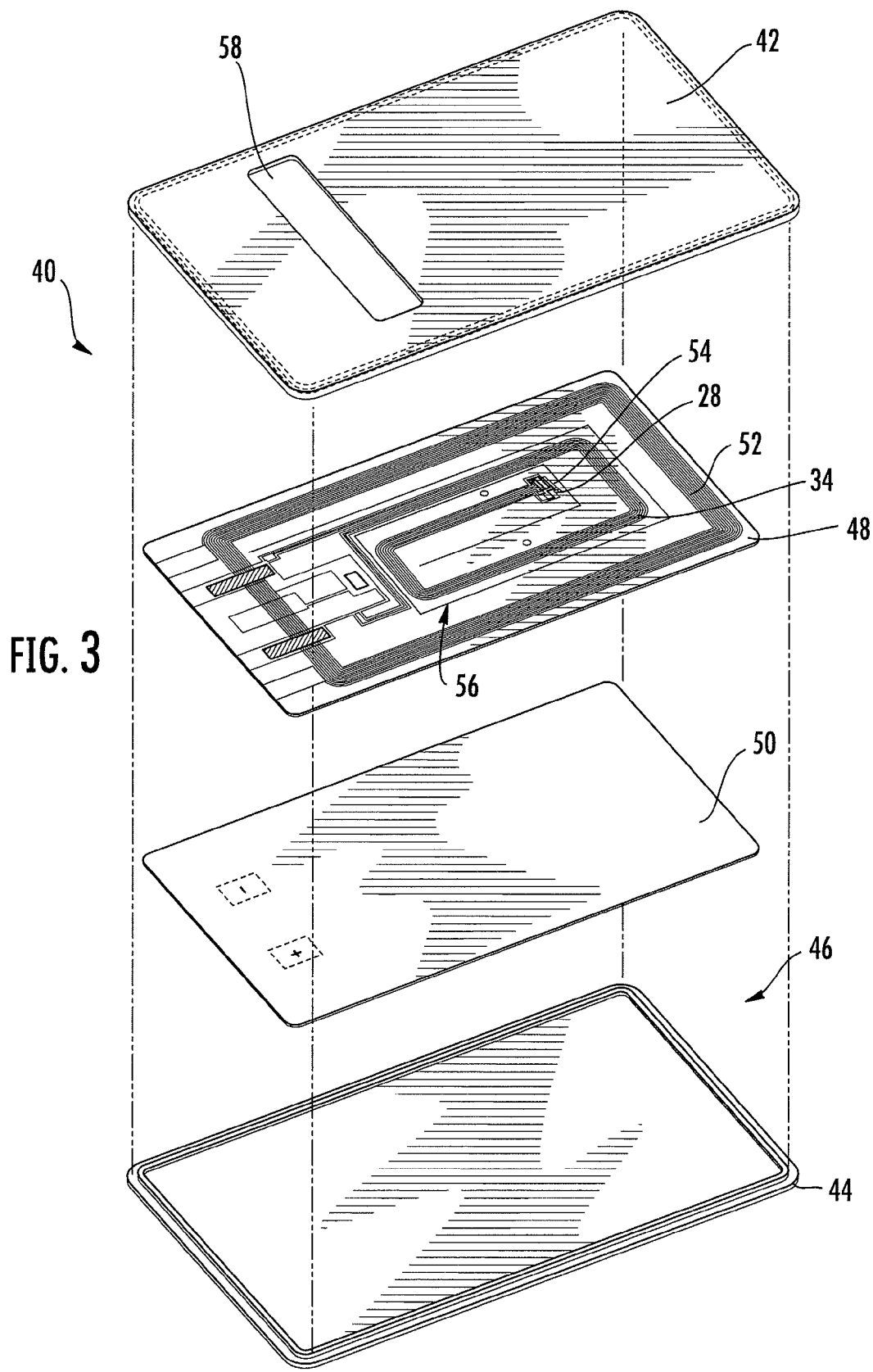
FIG. 3 is an exploded perspective view of a temperature monitoring device that is in accordance with one embodiment of the present invention.

Turning now to FIGS. 3 through 6, an embodiment of the invention is illustrated in which the temperature monitoring device includes an outer housing in which one or more components (e.g., the battery and RF transponder) of the temperature monitoring device are disposed. In this regard, FIG. 3 depicts an exploded perspective view of a temperature monitoring device 40 having two or more electronic components that are electrically interconnected. In one embodiment the temperature monitoring device 40 includes a first housing member 42 and a second housing member 44 that are attached together and configured to define an interior space 46 therebetween. The temperature monitoring device 40 includes first and second electronic components 48, 50 that are disposed in interior space 46 and that are capable of being electrically interconnected.

FIG. 3 illustrates an embodiment wherein electronic component 48 comprises a flexible sheet material having a flexible circuit that includes an RF antenna 52, an RF chip 54, and a temperature sensor 28. In this embodiment, the RF chip of the RF transponder and the temperature sensor 28 comprise a single integrated circuit. The RF chip and RF antenna may comprise a single integrated structure or may comprise separated components that are disposed on a single electronic component or on two or more electronic components. Electronic component 50 may comprise a power supply, such as a battery, that is electrically interconnected to electronic component 48 via opposing pairs of electrical contacts on each respective electronic component. In one embodiment, one of the housing members (e.g., housing member 42) includes an opening 58 through which the electric circuit 34 including the temperature sensor 28 can be extended out of the housing member and be positioned in a temperature monitoring relationship with the interior space of the compartment, and at a spaced apart location from the battery 50.

In one embodiment, electric circuit 34 can be an integral part of electronic component 48. As discussed above, electric circuit 34 electrically interconnects the temperature sensor 28 with one or more additional components of the electronic monitoring device (e.g., RF transponder, RF antenna, and battery). In other embodiments, electric circuit 34 may comprise a separate circuit that is electrically joined to the RF transponder (e.g., electronic component 48).

In one embodiment, the electrical circuit 34 comprises a flexible material that is capable of extending outwardly from electronic component 48 so that the temperature sensor can be positioned in a spaced apart location from the battery. In this regard, FIG. 4 illustrates electric circuit 34 including temperature sensor 28 extending out of the housing member through opening 58. In this embodiment, electronic component 48 includes one or more separation or cut lines 56 that define the shape and length of the electric circuit 34. In some embodiments, electric circuit 34 including the cut lines define the length of the electric circuit having a generally spiral or serpentine shape that permits the length of the electric circuit to be increased, and hence the distance between the temperature sensor and the battery to be increased. As shown in FIGS. 4 and 5, this spiral/serpentine shape permits electric circuit 34 to have a relatively flat configuration for storage in the housing 40 so that a relatively long electronic circuit can be stored in the housing in a relatively compact state. As shown in FIG. 5, the electric circuit 34 is capable of extending outward from the housing for positioning the temperature sensor in a temperature monitoring relationship with the interior space of the container.

Figure 6:
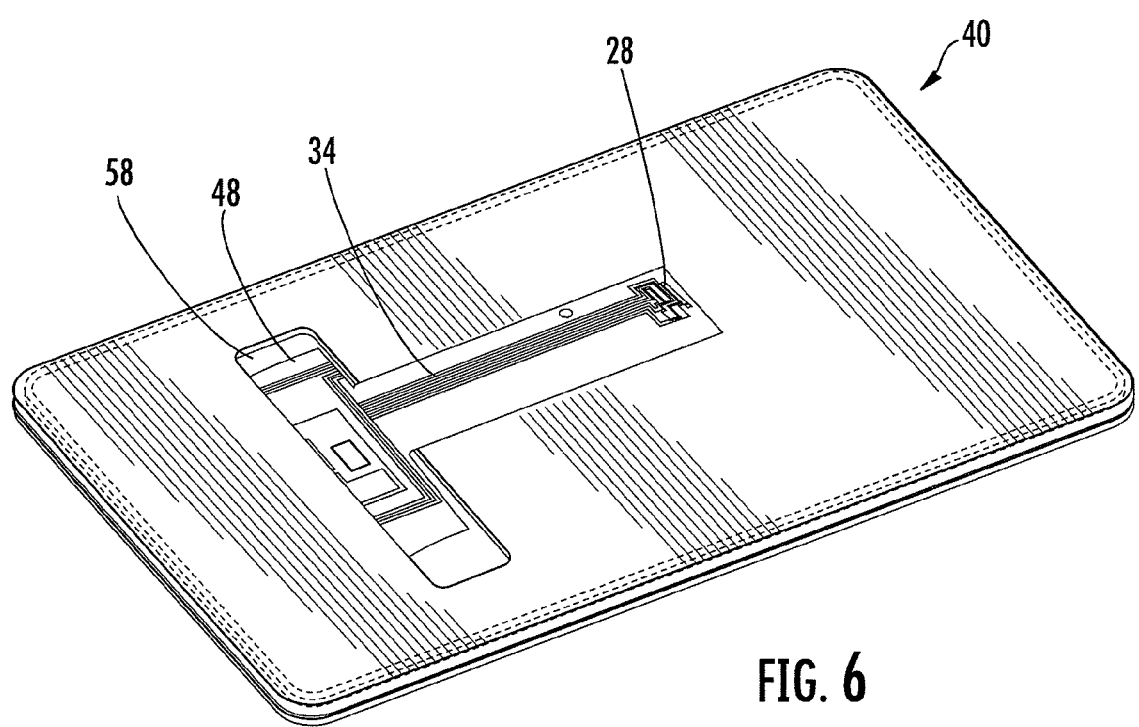
FIG. 6 is perspective view of an alternative embodiment of the temperature monitoring device.

In other embodiments, the electric circuit may have a relatively shorter length. For examples, FIG. 6 depicts an embodiment wherein the electric circuit 34 has a relatively straight shape and does not include a spiral/serpentine shape. In some embodiments, the length of the electric circuit can be increased with the insertion of a strip of flexible circuit material having electrical conductors that can be aligned with existing circuitry on the electric circuit and the RF transponder and/or battery. In this embodiment, the strip of flexible circuit material can act as an extension cord in increasing the overall length of the electric circuit. Use of the flexible circuit material may permit the use of conventional temperature monitoring devices, such as data loggers, in the practice of the invention. In some conventional devices, the temperature sensor and the RF transponder including the RF antenna may be formed on a single flexible sheet material. In such cases, it may be necessary to form cut lines in the flexible sheet material that separate the temperature sensor and a portion of its circuitry from the sheet so that the temperature sensor can be extended out of the housing. In one embodiment, the length of the electric circuit can range from about 0.5 to 12 inches and in particular, from about 1 to 6 inches.

Figure 7:
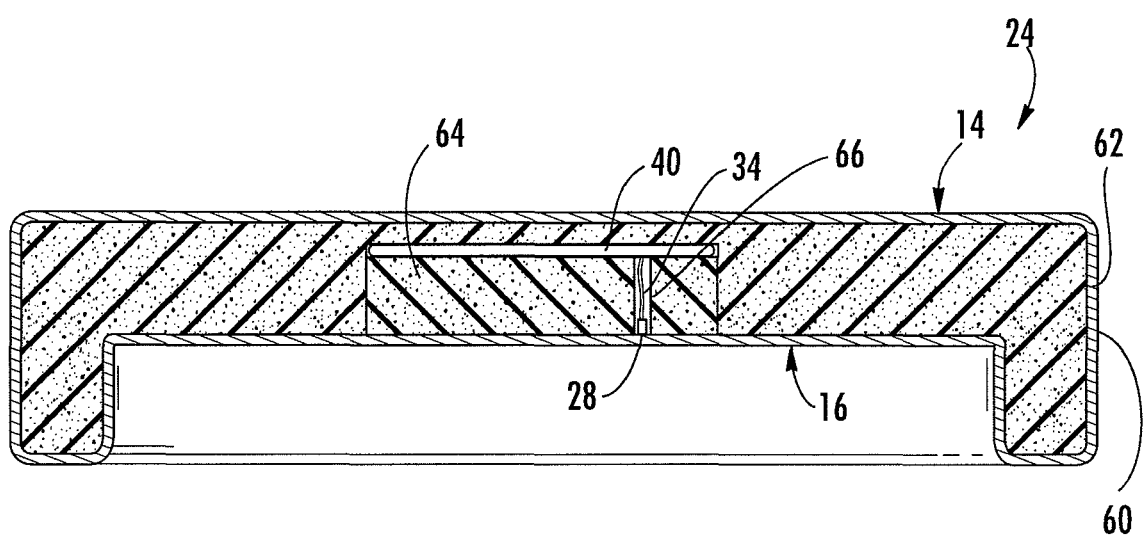
FIG. 7 is a cross-sectional side view of a wall of the container in which a temperature monitoring device is embedded.

With reference to FIG. 7, an embodiment of the present invention is illustrated in which the container includes a temperature monitoring device that is embedded in a wall of the container, such as a lid. In this embodiment, the various components (e.g., RF antenna and battery) of the temperature monitoring device 40 are disposed in the interior of the temperature monitoring device 40. Electric circuit 34 extends from the housing of the temperature monitoring device to temperature sensor 28. As shown, the wall 24 includes an outer film layer 60 that is adhered to an inner foam core 62. The temperature sensor 28 is shown as being embedded in the wall adjacent to the inner surface 16 of the wall. In one embodiment, temperature monitoring device 40 can include an electric circuit 34 that is capable of extending outwardly from the housing of the device. Alternatively, temperature monitoring device 40 may comprise a conventional monitoring device that has been modified so that the temperature sensor can be spaced apart from the battery and positioned in a temperature monitoring relationship with the interior space of the container.

In one embodiment, the container having the embedded temperature monitoring device can be formed in an expansion molding process in which a foam or similar insulating material is injected and formed about the components of the device to produce a wall having a desired configuration. For example, the container can be produced by first positioning the various components of the device in their desired orientation in a mold for forming one or more walls of the container. Thereafter, the foam or similar insulating material is injected into the mold and allowed to expand and set. In some embodiments, a spacing member, such as foam block, casing, or similar support structure can be used to position the components of the device in the mold prior to injecting the insulating material. In this regard, FIG. 7 illustrates an embodiment wherein a spacing member 64 is disposed within the wall and is used to position the temperature sensor 28 in a temperature monitoring relationship with the interior space of the container as well as position the battery at a spaced apart location from the interior space of the container. In some embodiments, spacing member 64 includes a channel 66 through which the electric circuit 34 extends from the housing of the temperature monitoring device so that the temperature sensor 28 can be positioned adjacent to an inner surface of the container. Spacing member also maintains the battery at a position that is towards the outer surface 14 of the container, and that is spaced apart from the interior space of the container.

In one embodiment, the temperature monitoring device may be capable of performing one or more functions, for example, identification, monitoring, and/or tracking functions. In some embodiments, the electronic devices may include one or more internal electronic components that are capable of performing one or more functions. Such electronic components may include, for example, processors, memory components, external interface components (including both wired and wireless), sensor elements, display elements (such as an LCD display), power supplies, and the like, and combinations thereof. In addition, the electronic components may include integrated circuits, transistors and diodes, and passive components such as resistors, capacitors and inductors, and the like. Examples of various types of electronic devices may include smart tags, smart cards, RF tags, RFID tags, wireless cards, wireless tags, contact cards, data loggers, tags, and the like.

In one embodiment, the temperature monitoring device may include one or more sensors for monitoring various conditions to which the electronic device has been exposed. In one embodiment, the electronic device may include a RF antenna that may permit wireless communication between the temperature monitoring device and an external interface or reader. The electronic device may also include a processor and/or memory component for processing environmental measurements and for storing such measurements. In embodiments where the electronic component includes an RF antenna, information may be wirelessly transmitted to and from the temperature monitoring device.

As discussed above, the electronic components may include sensor elements, display elements, an RF antenna, memory components, processors, control circuits, power supplies, and the like. In some embodiments, the electronic components may include one or more additional sensors for measuring one or more environmental conditions in the interior space of the container. Exemplary environmental conditions that may be monitored include, but are not limited to, relative humidity, light intensity, on/off, open/closed, voltage, pressure, shock/vibration, and other events over time. In one embodiment, the electronic component may comprise a circuit having a control circuit and an RF antenna. In other embodiments, the electronic component may comprise a power supply, such as a battery, that may be electrically interconnected to an adjacent electronic component.

In one embodiment, the temperature monitoring device may include a memory component that can be configured to store data and information including, but not limited to, recorded measurements, temperature measurements as a function of time, programming and operational instructions for the electronic device, identification information, tracking information, and the like. In some embodiments, the memory may be configured to buffer data that is measured by the temperature monitoring device, such as flash memory or EPROM. Flash memory refers generally to a type of nonvolatile memory that can be erased and reprogrammed in units of memory called blocks. The capacity of the memory component can be varied depending upon the desired amount of data that can be stored before downloading the data into an external computer or similar device. In some embodiments the capacity of the memory component may comprise 64K, 128K, 256K, 512K, or greater memory blocks. In one embodiment, the memory component, radio frequency circuit, and the temperature sensor may comprise a single integrated circuit. In a further embodiment, the temperature monitoring device may include a single integrated circuit comprising control circuit(s), the memory component, radio frequency circuit, and the temperature sensor.

In one embodiment, the first and second housing members may define a temperature monitoring device that is about the size of a credit card. In some embodiments, the first and second housing members may comprise a material having a rigid or semi-rigid structure. In other embodiments, the housing member may have a more flexible structure.

The temperature monitoring device may include a radio frequency (RF) transceiver that can wirelessly send and receive data between the device and a reader. The temperature monitoring device can also include a radio frequency identification (RFID) communication means or interface that can enable wireless communication with the electronic device. In one embodiment, the temperature monitoring device may employ radio frequency identification (RFID) communication protocols to activate, program, and send or retrieve data to and from the electronic device. The use of RFID technology in electronic devices, such as data loggers, may permit the stored data to be quickly retrieved from the devices. For instance, an RFID reader in communication with a computer can be used to activate and retrieve data from an electronic monitoring device at various points throughout a distribution system. To retrieve the information, the electronic monitoring device may be connected to a computer or brought into close proximity with an RFID reader.

In some embodiments, the temperature monitoring device may be adapted to monitor and record a wide variety of conditions, such as those discussed above. Temperature monitoring devices can be activated in a wide variety of ways. In some embodiments, the temperature monitoring device may be manually activated by pushing a button or triggering a switch. In other embodiments, the temperature monitoring device can be activated through wired or wireless communication with a computer or reader, such as a RFID reader.

In one embodiment, the temperature monitoring device may be activated or programmed by connecting it directly to a computer or reader that can be used to send and retrieve data to and from the temperature monitoring device. In some embodiments, the temperature monitoring devices can also be activated by manual operation, such as a switch or push button. The temperature monitoring device can be configured to record each measurement and store it in memory. In some embodiments, the temperature monitoring device may also be capable of recording the date and time at which the measurement was taken so that a time-temperature history of the object being monitored can be produced. At a desired time, the data contained within the temperature monitoring device can be retrieved by communicating with an RF reader or similar device.

As should be recognized from the above discussion, the insulated container of the present invention can be used in a wide variety of applications for maintaining a temperature-sensitive object in a low temperature state. In one embodiment, the insulated container may be used for storing and shipping a wide variety of objects that are temperature sensitive, such as pharmaceuticals, food products such as meats, produce, and dairy products, electronics, chemicals, cosmetic products, biological products, transplant tissues and organs, and the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An insulated container having an embedded temperature sensor, the container comprising:
    a plurality of walls defining a container having an outer surface, an inner surface, and an interior space, wherein the walls comprise a thermal insulation material, and wherein the inner surface of the container faces the interior space of the container;
    a radio frequency transponder having a radio frequency circuit and a radio frequency antenna;
    a temperature sensor disposed in a temperature monitoring relationship with the interior space of the container;
    an electric circuit extending through at least a portion of at least one of the walls and interconnecting the temperature sensor with the radio frequency antenna so that a temperature measurement of the interior space can be retrieved from the temperature sensor by communicating with the transponder; and
    a battery that is at least partially disposed in one of the walls of the container, wherein the battery is operatively connected with the radio frequency transponder and the temperature sensor, and wherein the position of the battery within the wall is selected so that the battery does not experience a temperature that is below an operating temperature of the battery, and wherein the battery and the radio frequency antenna are disposed in a housing having an interior space and wherein the electric circuit extends through an opening in the housing so that the temperature sensor is disposed at a location outside of the interior space of the housing.

2. The insulated container of claim 1, wherein at least one of the walls comprises a removable lid.

3. The insulated container of claim 1, wherein the container has a generally rectangular shape, and wherein the plurality of walls includes 4 side walls, a bottom wall, a mouth opposite the bottom wall defining an opening into the interior space of the container, and a lid for closing the opening.

4. The insulated container of claim 3, wherein the temperature sensor and radio frequency transponder are disposed in the lid of the container.

5. The insulated container of claim 1, wherein the radio frequency antenna is at least partially disposed in at least one of the walls of the container.

6. The insulated container of claim 5, wherein the radio frequency antenna is disposed in one of the walls of the container adjacent to an outer surface of the container, and wherein the temperature sensor is embedded in one of the walls at a spaced apart location from the radio frequency antenna.

7. The insulated container of claim 1, wherein the temperature sensor is embedded in one of the walls at a spaced apart location from the battery.

8. The insulated container of claim 7, wherein the temperature sensor and the battery are spaced apart from each other by a distance of between about 0.5 and 12 inches.

9. The insulated container of claim 1, wherein the temperature sensor and the radio frequency transponder are embedded within a wall of the container at a spaced apart location from each other.

10. The insulated container of claim 9, wherein the temperature sensor and the radio frequency transponder are separated from each other by a distance of between about 0.5 and 12 inches.

11. The insulated container of claim 10, wherein the temperature sensor and the radio frequency transponder are separated from each other by a distance of between about 1 and 6 inches.

12. The insulated container of claim 1, wherein the container has a generally cylindrical shape.

13. The insulated container of claim 1, wherein the temperature sensor is in direct contact with an atmosphere of the interior space.

14. The insulated container of claim 1, wherein a portion of the wall containing the temperature sensor separates the temperature sensor from the interior space of the container.

15. The insulated container of claim 1, wherein one or more of the walls comprise a foamed material.

16. The insulated container of claim 15, wherein the foam comprises a polyolefin, polyurethane, polystyrene, or a combination thereof.

17. The insulated container of claim 1, wherein one or more of the walls includes a metallized film or metallic foil layer that is disposed between the temperature sensor and the radio frequency antenna.

18. The insulated container of claim 1, wherein the temperature sensor is at least partially disposed in the interior of the container.

19. The insulated container of claim 1, wherein the temperature sensor and a portion of the electric circuit are at least partially disposed in the interior of the container.

20. The insulated container of claim 1, wherein a refrigerant having a temperature of about −70° C. is disposed in the interior space of the container and wherein the battery comprises an electrolyte that freezes at temperatures approaching or below −40° C.

21. A method of preparing an insulated container having a temperature sensor, the method comprising the steps of:
forming a container having a plurality of walls, the container having an outer surface, an inner surface, and an interior space, wherein the walls comprise a thermal insulation material, and wherein the inner surface of the container faces the interior space of the container;
positioning a temperature sensor within the container in a temperature monitoring relationship with the interior space of the container, wherein the temperature sensor is electrically interconnected with a radio frequency transponder; and
positioning a battery at least partially in one of the walls of the container, wherein the battery is operatively connected with the transponder and the temperature sensor via an electric circuit, and wherein the position of the battery is spaced apart from the interior space of the container so that the battery does not experience a temperature that is below an operating temperature of the battery, wherein the battery and the radio frequency antenna are disposed in a housing having an interior space and wherein the electric circuit extends through an opening in the housing and is in electrical communication with the temperature sensor so that the temperature sensor is disposed at a location outside of the interior space of the housing.

22. The method of claim 21, wherein the temperature sensor is at least partially disposed in the interior of the container.

23. The method of claim 21, wherein the step of positioning the temperature monitoring device includes the steps of:
providing a housing in which the temperature sensor, radio frequency transponder, and the battery are disposed, and wherein the temperature sensor includes an electric circuit that interconnects the temperature sensor with the battery;
extending the temperature sensor through an opening in the housing; and
positioning the temperature sensor in a spaced apart location from the battery.

24. The method of claim 23 wherein the electric circuit has a length that is between about 1 and 12 inches.

25. The method of claim 21, wherein the steps of positioning the temperature sensor and the battery include the step of forming at least one of the walls of the container around the temperature sensor and the battery, wherein the battery and an electric circuit interconnecting the battery with the temperature sensor are disposed at least partially in the thus formed wall.

26. The method of claim 21, wherein the temperature sensor is positioned adjacent to an inner surface of the container and the battery is positioned adjacent to an outer surface of the container.

27. A method of monitoring the temperature of a temperature-sensitive object, the method comprising the steps of:
placing a temperature-sensitive object in the interior space of an insulated container, the container comprising:
i. a container having an outer surface, an inner surface, and an interior space, wherein the container comprise a thermal insulation material, and wherein the inner surface of the container faces the interior space of the container;
ii. a radio frequency transponder having a radio frequency antenna;
iii. a temperature sensor disposed in a temperature monitoring relationship with the interior space of the container, and that is interconnected with the radio frequency antenna via an electric circuit so that a temperature measurement of the interior space can be retrieved from the temperature sensor by communicating with the transponder; and
iv. a battery that is at least partially disposed in one or more walls of the container, wherein the battery is operatively connected with the radio frequency transponder and the temperature sensor, and wherein the position of the battery within the wall is selected so that the battery does not experience a temperature that is below an operating temperature of the battery; and wherein the battery and the radio frequency antenna are disposed in a housing having an interior space and wherein the electric circuit extends through an opening in the housing so that the temperature sensor is disposed at a location outside of the interior space of the housing; and placing a refrigerant in the interior space of the container to maintain the temperature-sensitive object at a temperature that is below the normal operating temperature of the battery.

28. The method of claim 27, wherein the object comprises a product selected from the group of pharmaceuticals, electronics, chemicals, cosmetic products, biological products, transplant tissues and transplant organs, and combinations thereof.

29. The method of claim 27, further comprising the step of wirelessly retrieving the temperature of the interior space of the container.

30. The method of claim 27, wherein the temperature sensor is at least partially disposed in the interior of the container.

* * * * *